(12) United States Patent
Young

(10) Patent No.: US 6,536,772 B1
(45) Date of Patent: Mar. 25, 2003

(54) ENTERTAINMENT APPARATUS

(75) Inventor: Jay Young, Cardiff (GB)

(73) Assignee: Belitha Press Limited, London (GB)

( * ) Notice: Subject to any disclaimer, the term of this patent is extended or adjusted under 35 U.S.C. 154(b) by 0 days.

(21) Appl. No.: 09/958,858

(22) PCT Filed: Apr. 13, 2000

(86) PCT No.: PCT/GB00/01413

§ 371 (c)(1),
(2), (4) Date: Jan. 9, 2002

(87) PCT Pub. No.: WO00/61249

PCT Pub. Date: Oct. 19, 2000

(30) Foreign Application Priority Data

Apr. 13, 1999 (GB) ............................................. 9908455

(51) Int. Cl.⁷ .................................................. A63F 5/04
(52) U.S. Cl. ...................................... 273/430; 273/239
(58) Field of Search ............................... 273/430, 431, 273/432, 456, 138.2, 141 A, 239

(56) References Cited

U.S. PATENT DOCUMENTS

| | | | |
|---|---|---|---|
| 3,399,893 A | | 9/1968 | Payne, Jr. |
| 3,559,995 A | * | 2/1971 | Steadman |
| 3,640,537 A | * | 2/1972 | Klamer et al. |
| 3,707,290 A | * | 12/1972 | Birnkrant |
| 4,211,414 A | | 7/1980 | Moodt ........................ 273/141 |
| 4,508,344 A | * | 4/1985 | Krogh |
| 5,085,434 A | * | 2/1992 | Soto |
| 5,405,141 A | | 4/1995 | Wilkes ........................ 273/94 |

FOREIGN PATENT DOCUMENTS

GB          1 540 799         2/1979       ............ G09B/3/06

* cited by examiner

Primary Examiner—William M. Pierce
(74) Attorney, Agent, or Firm—Michael A. Glenn

(57) ABSTRACT

Entertainment apparatus comprising a book and a mechanical indicator; wherein the book comprises a plurality of bound pages, a first mounting means having a reference means provided in a first predetermined relative position thereto, and a second mounting means having a first magnet provided in a second predetermined relative position thereto, and the mechanical indicator comprises a rotatable member attached to an indicating member and which is selectively rotatable with respect to the indicating member, and a second magnet, and wherein the reference means restricts relative rotation of the rotatable member when the mechanical indicator is mounted on the first mounting member and the indicating member is rotated with respect to the rotatable member, the first and second magnets can interact to rotate the mechanical indicator when the mechanical indicator is mounted on the second mounting means, and the rotatable member does not rotate with respect to the indicating member when the mechanical indicator is rotated by the first and second magnets.

8 Claims, 2 Drawing Sheets

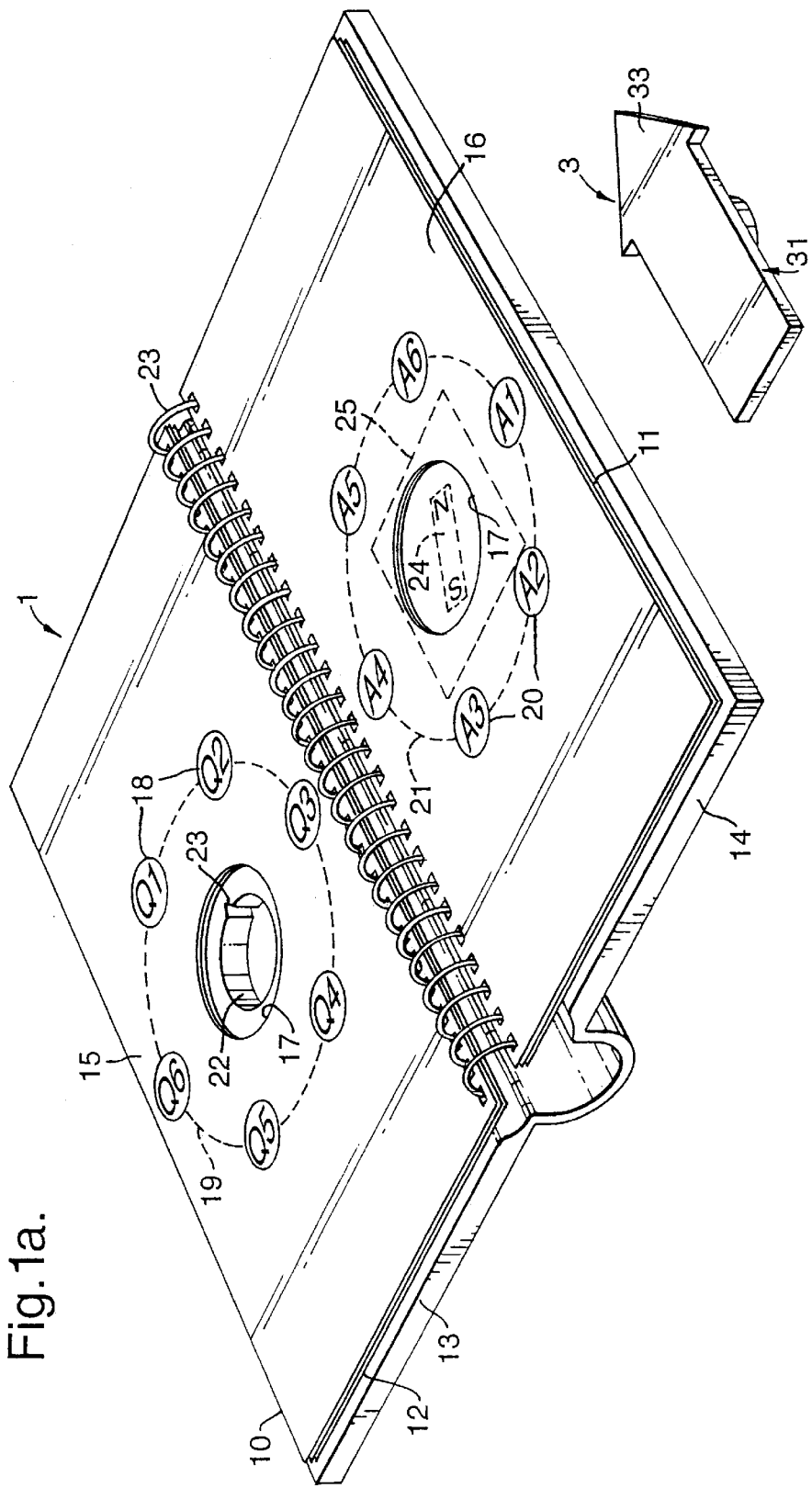

ENTERTAINMENT APPARATUS

BACKGROUND OF THE INVENTION

1. Technical Field

This invention relates to question and answer books.

2. Description of the Prior Art

Previously question and answer books (especially children's) have relied on the answers to questions being found, for example, on different pages or written upside down on the same page. These methods can lead to errors in reading answers to specific questions and are generally a nuisance and time consuming. Answering questions in such books can be unexciting and children can easily loose interest in such books.

In the 1950's MERIT produced a quiz called 'Magic Robot' In this quiz questions and answers are written on a single sheet of card. The operator manually selects a question using a mechanical indicator and subsequently the mechanical indicator can be used to 'magically' indicate the answer to that question. The 'Magic Robot' mechanism relies on the interaction of a magnet on the card with a magnet in the mechanical indicator and selective rotation between two parts of the magnetic indicator.

SUMMARY OF INVENTION

According to the present invention there is provided an entertainment apparatus comprising a book and a mechanical indicator; wherein the book comprises: a plurality of bound pages; a first mounting means having a reference means provided in a first predetermined relative position thereto; and a second mounting means having a first magnet provided in a second predetermined relative position thereto; and the mechanical indicator comprises: a rotatable member attached to an indicating member and which is selectively rotatable with respect to the indicating member; and a second magnet; and wherein: the reference means restricts relative rotation of the rotatable member when the mechanical indicator is mounted on the first mounting member and the indicating member is rotated with respect to the rotatable member; the first and second magnets can interact to rotate the mechanical indicator when the mechanical indicator is mounted on the second mounting means; and the rotatable member does not rotate with respect to the indicating member when the rotatable member is rotated by the first and second magnets.

Opposing pages in the book may contain a question list on one page and a corresponding answer list on the opposing page. The operator can manually select a question from a question list with the mechanical indicator and then place the mechanical indicator adjacent to a corresponding answer list. The mechanical indicator will then automatically move to a position where the answer to the previously selected question is indicated.

In this way the invention may provide a question and answer book. Questions and answers may be provided on opposing pages in the book without making the answer to the question immediately obvious. The answers to selected questions may be indicated mechanically in an interesting way. The invention has the advantage that the subject matter of the opposite sides of a page in the book may be completely self contained.

BRIEF DESCRIPTION OF THE DRAWINGS

The invention will be described by way of a non-limitative example with reference to the accompanying drawings in which.

FIG. 1a is a perspective view showing the book and mechanical indicator of the present invention.

DETAILED DESCRIPTION OF THE INVENTION

Figure 1B:
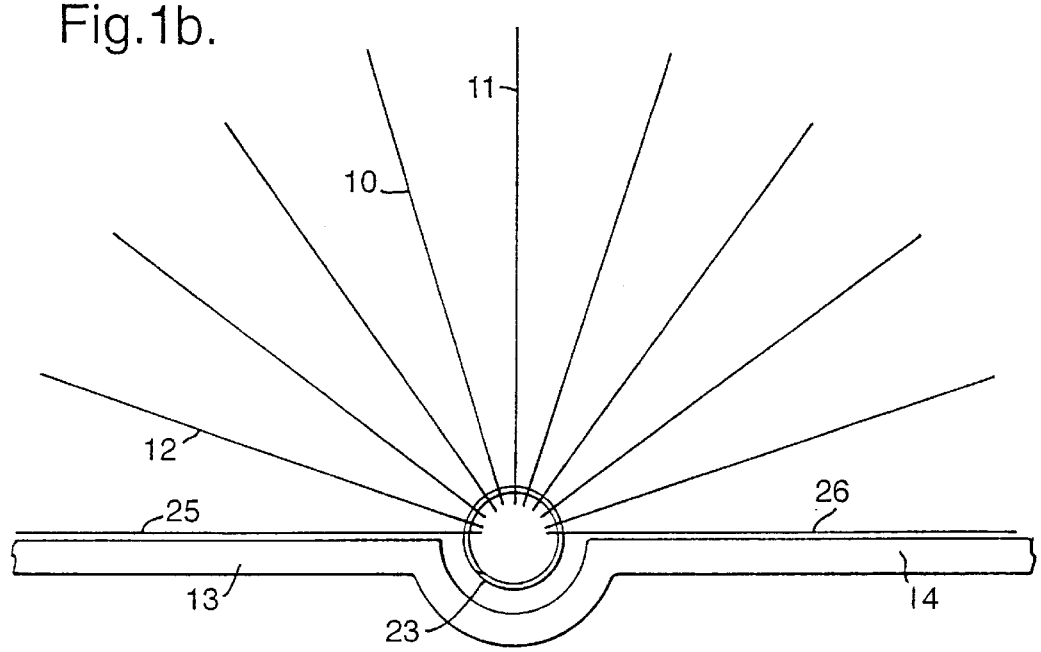
FIG. 1b is a side view showing the book of a preferred embodiment of the present invention.

FIG. 1a shows a book 1 and a mechanical indicator 3 according to the present invention. FIG. 1b shows how a preferred embodiment of the book is bound. The book consists a first cover 13 and a second cover 14 (which may be made of card) with a plurality of pages (e.g. 10,11,12) between them. The covers 13, 14 are preferably hard bound together. The plurality of pages may be held together by a spiral binding 23. The plurality of pages may then be attached to the first and/or second covers 13,14 by gluing the outermost pages 25, 26 of the plurality of pages to the inside of the first and second covers 13, 14. The remaining pages eg. 10, 11, 12, may then be freely turned. In the diagram the book 1 is open, with two sides 15,16 of two pages 10,11 facing upwards. All pages have a circular through hole 17 of the same size and with the same origin.

Questions 18, Q1–Q6 are printed on one side 15 at predetermined intervals around a circle 19 which is coaxial with the circular hole 17. On the other side 16 answers 20, A1–A6 are printed at the same predetermined intervals in a circle 21 which is coaxial with the through holes 17.

In this embodiment a cylindrical hole 22 is formed in the first cover 13 with the same origin as the circular holes 17. The cylindrical hole 22 may be lined with a plastic cup. Preferably, a notch 23 is formed in the circumference of the cylindrical hole 22 or the plastic cup. A first magnet 24 is fixed in the second cover 14 and preferably concealed from the user. A low friction material such as Mylar mirror paper 25 may be used to cover the area of the second cover 14 exposed by the through holes 17 and the first magnet 24. Preferably, the north and south poles of the first magnet 24 are positioned so that they are on either side of the origin of the through holes 17. The relative angular positions of the notch 23 and the first magnet 24 determine the positions of the questions 18 and the answers 20.

Figure 2A:
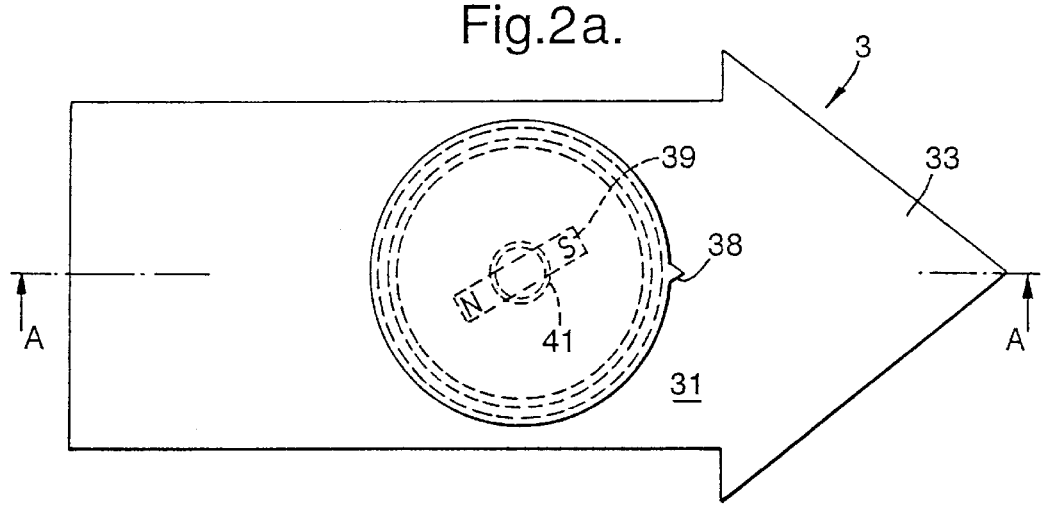
FIG. 2a is a bottom view showing the mechanical indicator of the present invention.
Figure 2B:
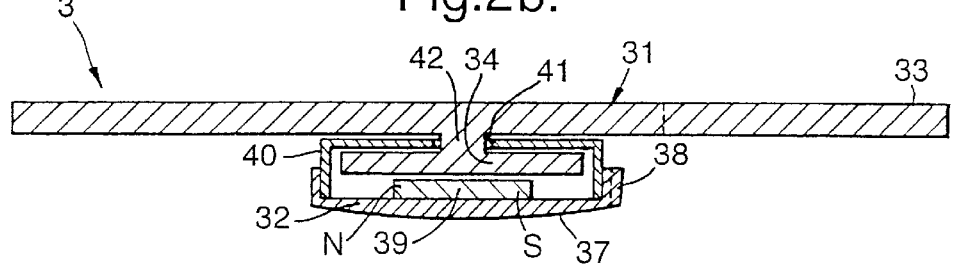
FIG. 2b is a cross-sectional view along line A—A in FIG. 2a, showing the mechanical indicator of the present invention.

The mechanical indicator 3 is shown in detail in FIGS. 2a and 2b and consists of an indicating member 31, a rotatable member 32 and a rotatable collar 40. In this example the indicating member 31 has an arrow at one end 33 for pointing to a question 18 or an answer 20. The mechanical indicator may be made, for example, of paper and card or plastic or a mixture.

In this embodiment the rotatable member 32 is in the shape of a circular dish with vertical side walls. The bottom outer surface 37 of the dish is convex and a protuberance 38 is formed on the outside of the vertical side wall. A second magnet 39 is attached to the bottom inner surface. A rotatable collar 40 consists of a cylindrical pipe with one end partly blocked by a flat surface with a hole 41 co-axial with the cylindrical pipe. The rotatable member 32 fits tightly over the outside of the rotatable collar 40 so that the two will not rotate with respect to each other. The rotatable collar 40 and the rotatable member 32 may be glued together. Part or all of the rotatable collar 40 and rotatable member 32 may be made of plastic. The convex surface 37 may be made of or covered in Mylar mirror paper.

The indicating member 31 has a circular disc 34 attached to the underside through an attachment means 42. The flat surface of the rotatable collar 40 lies sandwiched between the indicating member 31 and the circular disc 34 with the attachment means 42 in the co-axial hole 41. The fit of the rotatable collar 40 in the gap between the disc 34 and the indicating member 31 is tight enough so that the rotatable collar 40 and the indicating member 31 can be rotated with respect to each other manually but not under typical transportation forces.

The operation of the invention will now be described. First the rotatable member 32 is placed through the circular holes 17 of the pages between page 10 and the first cover 13. In this embodiment the rotatable member 32 sits in the hole 22 and the protuberance 38 is inserted into the notch 23 so that the rotatable member 32 cannot rotate with respect to the page 10. The indicating member 31 may now be rotated so that the arrow 33 points at a question 18 for which the operator desires the answer. By doing this the relative positions of the rotatable member 32 and the indicating member 31 are set.

Next the mechanical indicator 3 is removed from the first cover 13, care being taken not to change the relative positions of the rotatable member 32 and the indicating member 31. The rotatable member 32 is then placed through the circular holes of the pages between page 11 and the second cover 14. The mechanical indicator 3 lies on the convex surface 37 of the rotatable member 32, and therefore the mechanical indicator 3 can easily rotate. The mechanical indicator is rotated by the attractive and repulsive forces generated between the first magnet 24 and the second magnet 39 to a position where the answer to the previously selected question is indicated by arrow 33. Since there is no movement between the rotatable member 32 and the indicating member 31 subsequent to the question 18 being selected, the direction in which the arrow 33 points can be predicted and the answers 20 printed in the correct positions. The friction between the rotatable collar 40 and the indicating member 31 is such that when the mechanical indicator 3 is mounted in the cylindrical hole 22 the indicating member 31 can be rotated by the operator whilst the rotatable member 32 is held stationary in the hole 22. The weight of the mechanical indicator 3, the strengths of the first and second magnets and the friction between the rotatable collar 40 and the indicating member 31 are all such that when attached to the second cover 14, the mechanical indicator 3 can freely rotate under the force of the magnets but such that the rotatable member 32 will not rotate with respect to the indicating member 31 even if the indicating member 31 is held stationary or moved by the operator.

Alternatively pins can take the place of the circular hole 22 and the low friction material, if a rotation hole is located in the centre of the convex surface 37 of the rotatable member 32. In this case a knob can extend out of the first cover 13 away from the origin of the circular holes 17 to take the place of the notch 22. In this case, the convex surface 37 no longer needs to be convex.

Alternatively other methods apart from using the disc 34 and rotatable collar arrangement to adjust the friction between the rotatable member 32 and the indicating member 31 to the required level could be used. For example, a spring could be used to increase friction when no downward pressure is applied to the mechanical indicator 3 (when mounted on the second cover) and to keep friction low when downward pressure is applied (when mounted on the first cover and the operator is selecting a question). The level of required friction could also be set by a rachet system in the mechanical indicator. Still yet a further alternative would be a manually operated wedge which would be moved to a position preventing rotation of the rotatable member 32 with respect to the indicating member 31 by the operator once the desired question has been selected. Alternatively the rotatable member 32 could be directly attached to the indicating member 31 by a rivet.

Also the notch 23 and the hole 22 can be replaced by a pin with a non-circular cross section on the first cover and a corresponding rotation hole in the rotatable member 32.

What is claimed is:

1. Entertainment apparatus comprising a book and a mechanical indicator;
wherein
the book comprises:
a plurality of bound pages;
a first mounting means having a reference means provided in a first predetermined relative position thereto; and
a second mounting means having a first magnet provided in a second predetermined relative position thereto; and
the mechanical indicator comprises:
a rotatable member attached to an indicating member and which is selectively rotatable with respect to the indicating member; and
a second magnet; and
wherein:
the reference means restricts relative rotation of the rotatable member when the mechanical indicator is mounted on the first mounting member and the indicating member is rotated with respect to the rotatable member;
the first and second magnets can interact to rotate the mechanical indicator when the mechanical indicator is mounted on the second mounting means; and
the rotatable member does not rotate with respect to the indicating member when the mechanical indicator is rotated by the first and second magnets.

2. The entertainment apparatus of claim 1 wherein:
the book further comprises:
a first cover; and
a second cover.

3. The entertainment apparatus of claim 1 wherein:
the plurality of pages have through holes.

4. The entertainment apparatus of any one of the preceding claims wherein:
the plurality of pages are spirally bound and held between the first and second cover.

5. The entertainment apparatus according to any one of the preceding claims wherein:
the first mounting means has a cylindrical hole which supports the mechanical indicator when the mechanical indicator is mounted on the first mounting means.

6. The entertainment apparatus of according to claim 5 wherein:
the reference means comprises a notch which can engage with a protuberance on the rotatable member to prevent the rotatable member from rotating.

7. The entertainment apparatus of any one of the preceding claims wherein:
the surface of the rotatable member which faces away from the mechanical indicator is convex.

8. An entertainment apparatus constructed and arranged to operate substantially as hereinbefore described with reference to the accompanying drawings.

* * * * *